(12) United States Patent
Li et al.

(10) Patent No.: US 8,805,834 B2
(45) Date of Patent: *Aug. 12, 2014

(54) EXTENSIBLE SYSTEM AND METHOD FOR INFORMATION EXTRACTION IN A DATA PROCESSING SYSTEM

(75) Inventors: Yunyao Li, San Jose, CA (US); Frederick Ralph Reiss, Sunnyvale, CA (US); David Everett Simmen, Mountain View, CA (US); Suresh Thalamati, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 67 days.

This patent is subject to a terminal disclaimer.

(21) Appl. No.: 13/413,893

(22) Filed: Mar. 7, 2012

(65) Prior Publication Data

US 2012/0209844 A1 Aug. 16, 2012

Related U.S. Application Data

(63) Continuation of application No. 12/788,142, filed on May 26, 2010.

(51) Int. Cl.
*G06F 17/30* (2006.01)
(52) U.S. Cl.
USPC .......................................... 707/736; 707/757
(58) Field of Classification Search
CPC .................................................. G06F 17/3089
USPC .................................................. 707/736, 757
See application file for complete search history.

(56) References Cited

U.S. PATENT DOCUMENTS

| 6,311,194 | B1 | 10/2001 | Sheth et al. |
| 6,549,922 | B1 | 4/2003 | Srivastava et al. |
| 8,069,267 | B2 * | 11/2011 | Powers-Boyle et al. ...... 709/246 |
| 2005/0108630 | A1 | 5/2005 | Wasson et al. |
| 2006/0271885 | A1 | 11/2006 | Pittendrigh |
| 2008/0097968 | A1 | 4/2008 | Delgodo et al. |
| 2009/0319544 | A1 | 12/2009 | Griffin |
| 2009/0327323 | A1 * | 12/2009 | Altinel et al. ................. 707/101 |
| 2011/0295853 | A1 | 12/2011 | Li et al. |

FOREIGN PATENT DOCUMENTS

WO    WO2007091512 A1    8/2007

OTHER PUBLICATIONS

Wong et al., "Making Mashups with Marmite: Towards End-User Programming for the Web", Copyright 2007, ACM, pp. 1435-1444.*
Simmen et al., "Damia: Data Mashups for Intranet Applications", Copyright 2008, ACM, pp. 1171-1182.*

(Continued)

*Primary Examiner* — Hung Q Pham
(74) *Attorney, Agent, or Firm* — Janaki K. Davda; Konrad, Raynes, Davda and Victor LLP

(57) ABSTRACT

A data mashup system having information extraction capabilities for receiving multiple streams of textual data, at least one of which contains unstructured textual data. A repository stores annotators that describe how to analyze the streams of textual data for specified unstructured data components. The annotators are applied to the data streams to identify and extract the specified data components according to the annotators. The extracted data components are tagged to generate structured data components and the specified unstructured data components in the input data streams are replaced with the tagged data components. The system then combines the tagged data from the multiple streams to form a mashup output data stream.

9 Claims, 7 Drawing Sheets

(56) References Cited

OTHER PUBLICATIONS

List of prior art references cited in the parent U.S. Appl. No. 12/788,142.
Preliminary Amendment, dated Mar. 7, 2012, for U.S. Appl. No. 12/788,142 (54.123), filed May 26, 2010, entitled, "Extensible System and Method for Information Extraction in a Data Processing System", invented by Yunyao Li et al., pp. 1-8.
Office Action, dated Apr. 11, 2012, for U.S. Appl. No. 12/788,142 (54.123), filed May 26, 2010, entitled, "Extensible System and Method for Information Extraction in a Data Processing System", invented by Yunyao Li et al., pp. 1-12.
Response to Office Action, dated Jul. 11, 2012, for U.S. Appl. No. 12/788,142 (54.123), filed May 26, 2010, entitled, "Extensible System and Method for Information Extraction in a Data Processing System", invented by Yunyao Li et al., pp. 1-11.
Final Office Action, dated Aug. 9, 2012, for U.S. Appl. No. 12/788,142 (54.123), filed May 26, 2010, entitled, "Extensible System and Method for Information Extraction in a Data Processing System", invented by Yunyao Li et al., pp. 1-14.
Response to Final Office Action, dated Jan. 8, 2013, for U.S. Appl. No. 12/788,142 (54.123), filed May 26, 2010, entitled, "Extensible System and Method for Information Extraction in a Data Processing System", invented by Yunyao Li et al., pp. 1-6.
Preliminary Amendment, dated Feb. 9, 2013, for U.S. Appl. No. 12/788,142 (54.123), filed May 26, 2010, entitled, "Extensible System and Method for Information Extraction in a Data Processing System", invented by Yunyao Li et al., pp. 1-6.
Office Action, dated Mar. 21, 2013, for U.S. Appl. No. 12/788,142 (54.123), filed May 26, 2010, entitled, "Extensible System and Method for Information Extraction in a Data Processing System", invented by Yunyao Li et al., pp. 1-11.
Response to Office Action, dated Jul. 9, 2013, for U.S. Appl. No. 12/788,142 (54.123), filed May 26, 2010, entitled, "Extensible System and Method for Information Extraction in a Data Processing System", invented by Yunyao Li et al., pp. 1-9.
Final Office Action, dated Aug. 13, 2013, for U.S. Appl. No. 12/788,142 (54.123), filed May 26, 2010, entitled, "Extensible System and Method for Information Extraction in a Data Processing System", invented by Yunyao Li et al., pp. 1-12.
Response to Final Office Action, dated Nov. 12, 2013, for U.S. Appl. No. 12/788,142 (54.123), filed May 26, 2010, entitled, "Extensible System and Method for Information Extraction in a Data Processing System", invented by Yunyao Li et al., pp. 1-11.
Office Action, dated Dec. 3, 2013, for U.S. Appl. No. 12/788,142 (54.123), filed May 26, 2010, entitled, "Extensible System and Method for Information Extraction in a Data Processing System", invented by Yunyao Li et al., pp. 1-9.
Response to Office Action, dated Feb. 27, 2013, for U.S. Appl. No. 12/788,142 (54.123), filed May 26, 2010, entitled, "Extensible System and Method for Information Extraction in a Data Processing System", invented by Yunyao Li et al., pp. 1-13.
Pradeep Gangadharaiah "Damia: Dat Mashups for Intranet Applications", dated Oct. 20, 2008.
Siegfried Handschuh On Deep Annotation; ACM May 20-24, 2003, Budapest, Hungary.
IBM Mashup Center; http://www.-01.ibm.com/software/data/info20/how-it-works.html, pp. 1-5.
IBM, "Omifind Enterprise Edition: A Strategic Platform for Enterprise Search and text Analytics", dated Feb. 2008, Content Discovery Solutions, pp. 1-66.
Jhingran, "Enterprise Information Mashups: Integrating Information Simply", pp. 1-30.
Rajasekar Krishnamurthy SystemT: A System for Declarative Information Extraction; SIGMOD Record, Dec. 2008, (vol. 37. No. 4).
David B Leake Aiding Knowledge Capture by Searching for Extensions of Knowledge Models; ACM 2003.
Frederick Reiss, "An Algebraic Approach to Rule-Based Information Extraction", 24th International Conference on Data Engineering, Apr. 7-12, Cancun Mexico.
"System Text for Information Extraction", Oct. 16, 2008.
Zhu Zhang, "Weakly-Supervised Relation Classification for Information Extraction", ACM, 2004.
Notice of Allowance, dated Mar. 26, 2014, for U.S. Appl. No. 12/788,142 (54.123), filed May 26, 2010, entitled, "Extensible System and Method for Information Extraction in a Data Processing System", invented by Yunyao Li et al., Total 10 pp.

* cited by examiner

FIG. 4 - DETAILS OF BOX 210 OF FIG. 2 - UPLOAD NEW ANNOTATOR

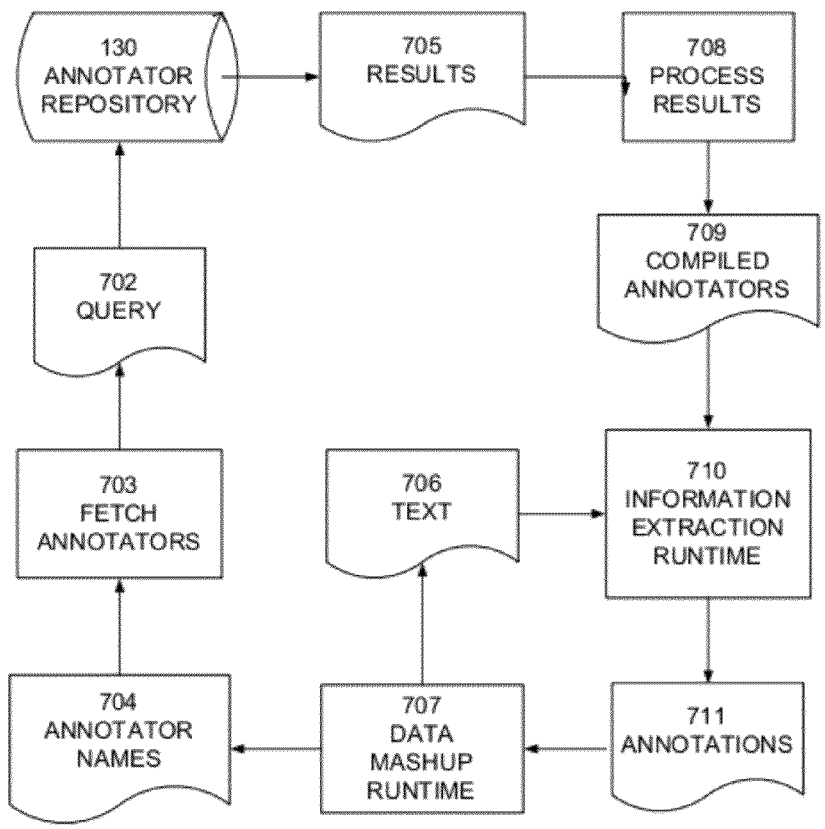
FIG 7 - DETAILS OF BOX 216 OF FIG.2 - ANNOTATOR REQUEST
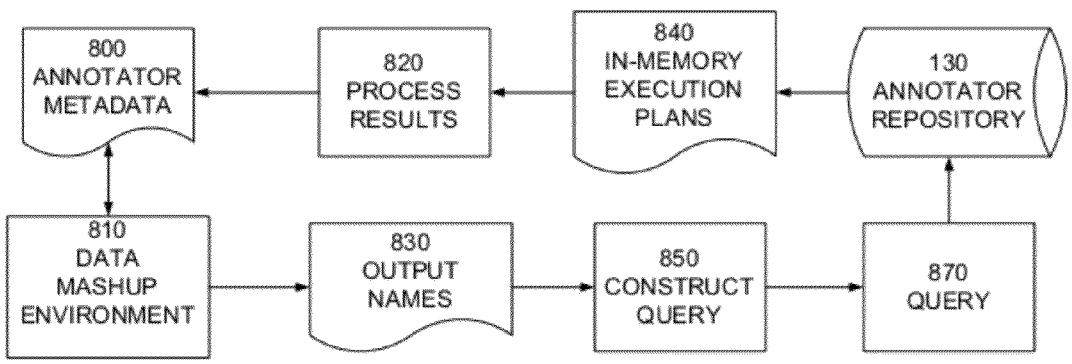
FIG. 8 - DETAILS OF BOX 201 OF FIG. 2 - SEARCH REQUEST

EXTENSIBLE SYSTEM AND METHOD FOR INFORMATION EXTRACTION IN A DATA PROCESSING SYSTEM This application is a continuation of parent application Ser. No. 12/788,142, filed on May 26, 2010.

TECHNICAL FIELD

This invention is related generally to the fields of networking and computing, and specifically to providing information extraction capabilities from data feeds to aid in the generation of application mashups.

BACKGROUND OF THE INVENTION

Increasingly large numbers of specialized applications are developed by enterprise business users in response to situational business needs. Such applications often require access to information derived by combining data in corporate databases, content management systems, and other IT managed repositories, with data from the desktop, Web, and other sources typically outside IT control. Web 2.0 inspired enterprise data mashup technologies, like IBM's InfoSphere MashupHub (MashupHub), have been developed to meet the data processing and data integration requirements of such applications. MashupHub, which originated from the Damia research project at IBM, provides visual facilities for quickly and easily creating data mashups that filter, join, aggregate, and otherwise transform feeds published from a wide variety of sources, into new feeds that can be consumed by AJAX, and other types of web applications.

An important class of enterprise mashup scenarios involves feeds derived from data created primarily for eye consumption, such as email, calendars, blogs, wikis, and web feeds. Such feeds often contain the data needed to perform mashup operations buried within swaths of unstructured element and attribute text. Consider a scenario where an account representative would like to get quick current events updates on customer accounts he or she is preparing to visit. His customer account information is available in a spreadsheet on a desktop. The representative would like to join this data with relevant news from popular business news feeds available on the Web. Unfortunately, business feeds on the web often have company references buried within unstructured text in a description or title field of the feed. For example, a Reuters business feed titled "Aston Martin expects 2009 sales to slow: report" identifies the company "Aston Martin" as the subject of the business news represented by the feed entry. This company information must be extracted from the text and added to the news feed as a structured attribute before it can be successfully joined with corresponding account information in the spreadsheet.

Information extraction technology can be a critical enabler in such scenarios, providing various types of text annotators for discovering entities, relationships, and other attributes that can be exploited by mashup operations. Current mashup technologies can typically make direct use of information extraction technology made available as web services. These services can be called from within a data mashup execution flow to annotate unstructured text within the data feed. There are significant efficiency concerns with this approach, however as (1) potentially large portions of feed text need to be transferred between the data mashup and the web service; (2) there might be many calls to the service for each execution of the data mashup—one or more per feed entry perhaps; (3) there is often significant network latency involved with web service calls. In addition to the performance concerns, exposing sensitive company data like email messages or call center records to an external web service can lead to security and privacy issues. Given the importance of information extraction technology to enabling this important class of data mashups, it is important that this technology be integrated tightly into the system.

Even ignoring the performance and security concerns, there are other drawbacks to relying exclusively on external annotation services. Another drawback is that the annotators provided by such services are generic and not necessarily tuned to work well in specific mashup environments. For example, a feed can join with more sources if it is annotated with more specific attributes such as street (e.g. "650 Harry Road"), city (e.g. "San Jose"), and state (e.g. "CA"), versus more general ones such as location (e.g. "650 Harry Road, San Jose, Calif."). Writing annotators that work with high specificity and low noise requires careful tuning of annotation rules. Moreover, annotators tuned for feeds must deal intelligently with markup. This requirement might mean ignoring html tags or exploiting XML element and attribute data (perhaps of parent or sibling nodes) to achieve greater precision and recall.

Yet another drawback is that the set of annotators provided by external services are fixed and hence cannot be extended with new annotators that target a particular installation, feed source, or mashup application. For example, a semiconductor company may need to extract information about Field-Programmable Gate Array (FPGA) users' performance requirements from articles in the technical press, a task that no pre-built library is likely to accomplish. Even if a remote text annotation service supports customized annotators and dictionaries, it is hard to share such customization efforts. The reasons are two-fold: first, users of such web services are unlikely to share the same scenario or data sources; second, companies need to protect their intellectual property and are unlikely to have their customized annotators and dictionaries stored at a third party.

Thus, there are deficiencies in the current art as it relates to the effective and efficient exploitation of information extraction from data processing systems. This deficiency is particularly evident in the context of data mashup systems, which often deals with data feeds derived from unstructured data sources. What is needed is a data processing system that provides efficient and extensible information extraction capabilities.

SUMMARY OF THE INVENTION

According to the disclosed embodiment of the invention, there is disclosed a method for generating a data mashup operation from input streams that combines data mashup with the extraction and replacement of unstructured data with structured data in an output stream. The method comprises receiving multiple streams of textual data, at least one of which contains unstructured textual data; storing annotators that describe how to analyze the streams of textual data for specified unstructured data components; applying the annotators to the input data streams to identify and extract the specified data components according to the annotators; tagging the extracted data components to generate structured data components and adding the tagged data components to the input data streams. The system combines the streams having tagged data to form a mashup output data stream.

One aspect of the invention provides a method for extending the execution engine of a data processing system (e.g. the Damia engine of MashupHub) with information extraction capabilities. In particular, the method enables the engine to evaluate an annotation request during execution of a data processing flow (e.g. a data mashup in MashupHub). An annotation request uses a specialized information extraction component to apply a specified set of annotation rules to unstructured feed data, producing a set of structured annotations (e.g. a data representation of an address, organization, person) that are subsequently inserted into the data feed. The annotation request is exposed to a programmer as a built-in function that can be invoked in the context of any data processing flow expression. The annotation rules specified by an annotation request can be selected from those previously defined to the data processing system and entered into its annotation rule repository. The data processing engine orchestrates the evaluation of an annotation request by (1) retrieving executable representations of relevant annotation rules from the annotation rule repository, (2) forming a target document for the annotation request by evaluating a document derivation expression over unstructured feed attributes; (3) invoking the specialized information extraction component, passing the target document and retrieved executable annotation rules; (4) adding the returned structured annotations into the feed. Multiple versions of the same annotation rule can coexist; therefore, the method retrieves only the most recent version of each annotation rule as per a data flow creation timestamp, which represents the point in time a currently executing data processing flow is created.

A second aspect of the invention provides a method wherein the information extraction capabilities of the data processing system can be dynamically extended by its user community. In particular, the method allows users to initiate an upload request whereby new annotation rules can be defined to the data processing system. An upload request receives new annotation rules in the form of an extraction file. An extraction file encapsulates all information for one or more annotation rules. An extraction file contains operational aspects of an annotation rule such as complex regular expressions and dictionaries, as well as definitions of annotation schemas which describe the format of the annotations produced by those rules. An upload request presents the extraction file to the specialized information extraction component, which processes it into an executable representation. The executable representation of an annotation rule, along with the annotation schema, and other associated metadata such as a version timestamp, are inserted into the annotation rule repository, thereby allowing the new annotation rule to become instantly available to the user community of the data processing system.

A third aspect of the invention provides a method that returns information about annotation rules that are current at a specified time. In particular, this method enables a search request against the annotation rule repository. The search request can return executable annotation rules, annotation schemas, and other information related to annotation rules that were current as of a provided version timestamp. A search request might be initiated from the context of an annotation request to retrieve versions of annotation rules in effect at the time a currently executing data processing flow was created. A search request might also be initiated by a client application (e.g. a GUI-based data processing flow designer) to show client-side users a current list of available annotation rules.

The aforementioned aspects of the invention represent a novel approach to dealing with the aforementioned deficiencies in the current art. Together, they provide a data processing system with efficient and extensible information extraction capabilities; thus enabling critical new scenarios involving feeds derived from unstructured data sources.

BRIEF DESCRIPTION OF THE DRAWINGS

The above and further features and advantages of embodiments of the present invention will become apparent upon consideration of the following detailed description thereof, particularly when taken in conjunction with the accompanying drawings wherein like reference numerals in the various figures are utilized to designate like components:

FIG. 7 is a flowchart showing additional details of box 216 of FIG. 2, which is the runtime processing of an annotator request to extract and transform unstructured input data into structured output data;

FIG. 8 is a flowchart showing additional detail of box 201 of FIG. 2, which is the processing of a search request to determine annotator names stored in the annotator repository.

DETAILED DESCRIPTION

Figure 1:
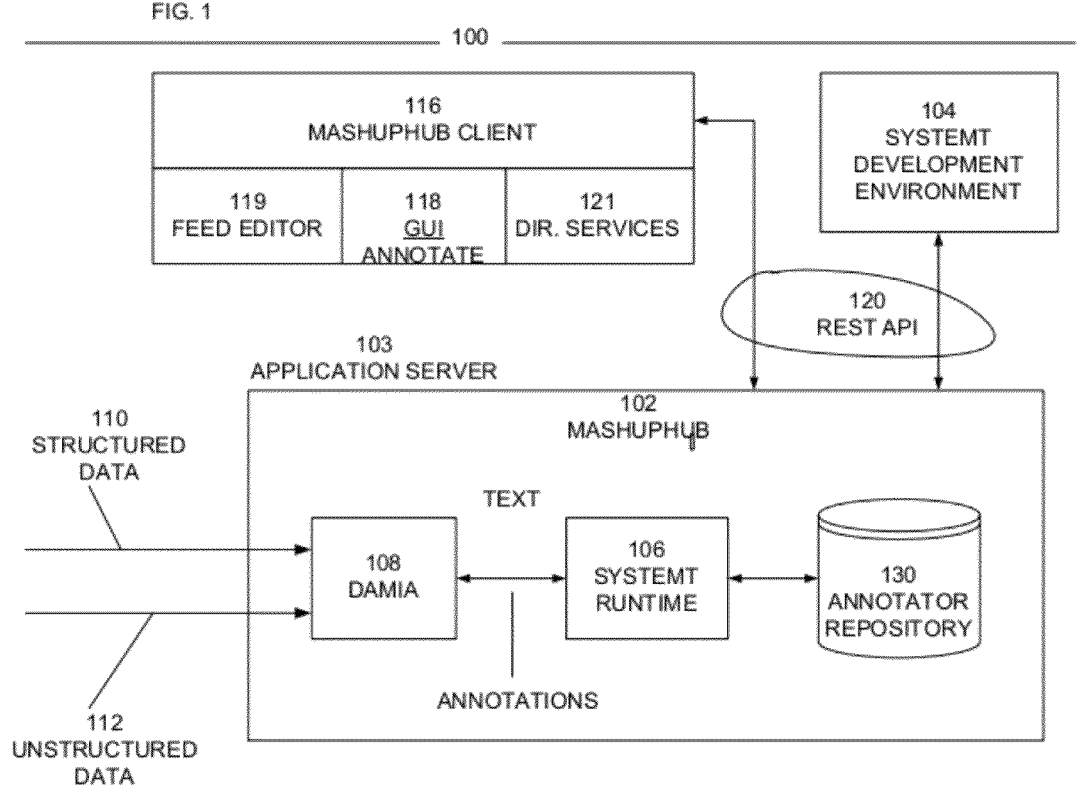
FIG. 1 is a simplified block diagram of a data integration system in accordance with an embodiment of the invention.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention enables filters, joins, aggregations, and other types of data processing operations on data created primarily for eye consumption, such as email, calendars, blogs, wikis, and web feeds, wherein the data needed to perform such operations is buried in unstructured text. In particular, various embodiments of the present invention relate to data mashup data processing systems that provide an environment where communities of users can create and share "data mashups" that combine data from desktop, web, and traditional IT sources into feeds that can be consumed by AJAX, and other types of web applications. Data mashup processing systems typically provide (1) a data mashup environment where programmers can use a GUI to compose a data mashup from a set of available operators and functions, (2) a data processing runtime wherein data mashups are executed when invoked by a client application, and (3) a metadata catalog where users can tag, rate, and share data mashups, as well as other information assets that might be consumed by data mashups.

In the illustrative embodiment of the invention, the data mashup system is enhanced with extensible information extraction capabilities, thereby enabling an important class of enterprise data mashup scenarios involving feeds that contain data needed to perform data mashup operations buried in unstructured element and attribute text. In particular, the invention extends the data mashup system with the capability to perform "annotate requests", "search requests", and "upload requests" involving "annotators", which are rules for extracting structured information (e.g. a data representation of an address, organization, or person) from text. An annotate request applies a specified set of annotators to unstructured feed data during data mashup execution, producing a set of structured annotations that are subsequently inserted into the data feed. An upload request allows users of the data mashup system to create custom annotator rules and make them available to other users via a metadata catalog, thereby allowing for the information extraction capabilities of the system to be dynamically extended. A search request provides versioned access to annotators and annotator metadata so that available annotators can be exploited during the data mashup specification and execution processes.

Referring now to the drawings, FIG. 1 illustrates a broad architecture of a system 100. This architecture incorporates a mashup software product available from International Business Systems (IBM), called MashupHub (MH) 102. System 100 is a system for building mashups in a tightly integrated environment based on a client-server architecture. MashupHub 102 executes in an application server 103, such as the IBM WebSphere® Application Server. A mashup annotation development product called SystemT Development Environment 104 is integrated into the system 100. SystemT 104 compiles annotator rules into a compiled execution plan, which is fed to the SystemT runtime module 106 for extracting information from incoming data feeds 110 and 112. MH 102 can operate with both structured and unstructured data feeds, as illustrated by structured data feed 110 and unstructured data feed 112. SystemT runtime module 106 is integrated into the IBM MashupHub (MH) 102 and communicates both with an annotator repository 114 where compiled versions of annotator rules are stored and with a product Damia 108 that uses compiled annotators to extract information from data feeds. Damia 108 is described further below. A compiled annotation is derived from a source annotator. A source annotation is a developer designed script of one or more rules and in this illustrative embodiment is written in a language called AQL (Annotation Query Language). AQL is a declarative rule language that makes it easy to express precise specifications for complex patterns in text. AQL is described in a publication in the SIGMOID Record, December 2008, special section on Managing Information Extraction, by R. Krishnamurthy et al. and entitled "SystemT: A System for Declarative Information Extraction". A standalone version of SystemT is available for download at a public IBM web site at URL address http://www.alphaworks.ibm.com/tech/systemt/download.

Damia 108 in its original stand-alone form assists developers with designing mashups, but the original stand-alone form does not contain information extraction technology, which is a major feature of this novel system. Data feeds are received into the Damia 108 component. Damia compiles and executes data mashups. It exposes a collection of set-oriented operators for filtering, joining, grouping, transforming, sorting, and otherwise manipulating a generic feed data model. Stand-alone Damia is described in a paper by David Simmen et al at ACM SIGMOID 2008 Conference entitled "Damia: Data Mashups for Intranet Applications". Damia also provides a set of functions and expressions for performing intra-operator manipulations of string, date, numeric, and other data types. A developer at the MH client 116 designs annotators using a browser-based GUI 118. This system development environment supports the iterative designer process of constructing and refining rules for information extraction. The development environment provides facilities for visualizing the results of executing rules over a corpus of representative documents. Once a designer is satisfied with the results that an annotator produces on data, the annotator is published. First, the AQL rules are fed into an optimizer [not shown], which uses cost-based optimization to compile the annotation into a graph of algebra operators. The compiled annotation is loaded into SystemT runtime 106 on the application server. The REST API's 120 between the MH client 116 and application server 103 are used to upload new annotators to systemT runtime 106.

Figure 2:
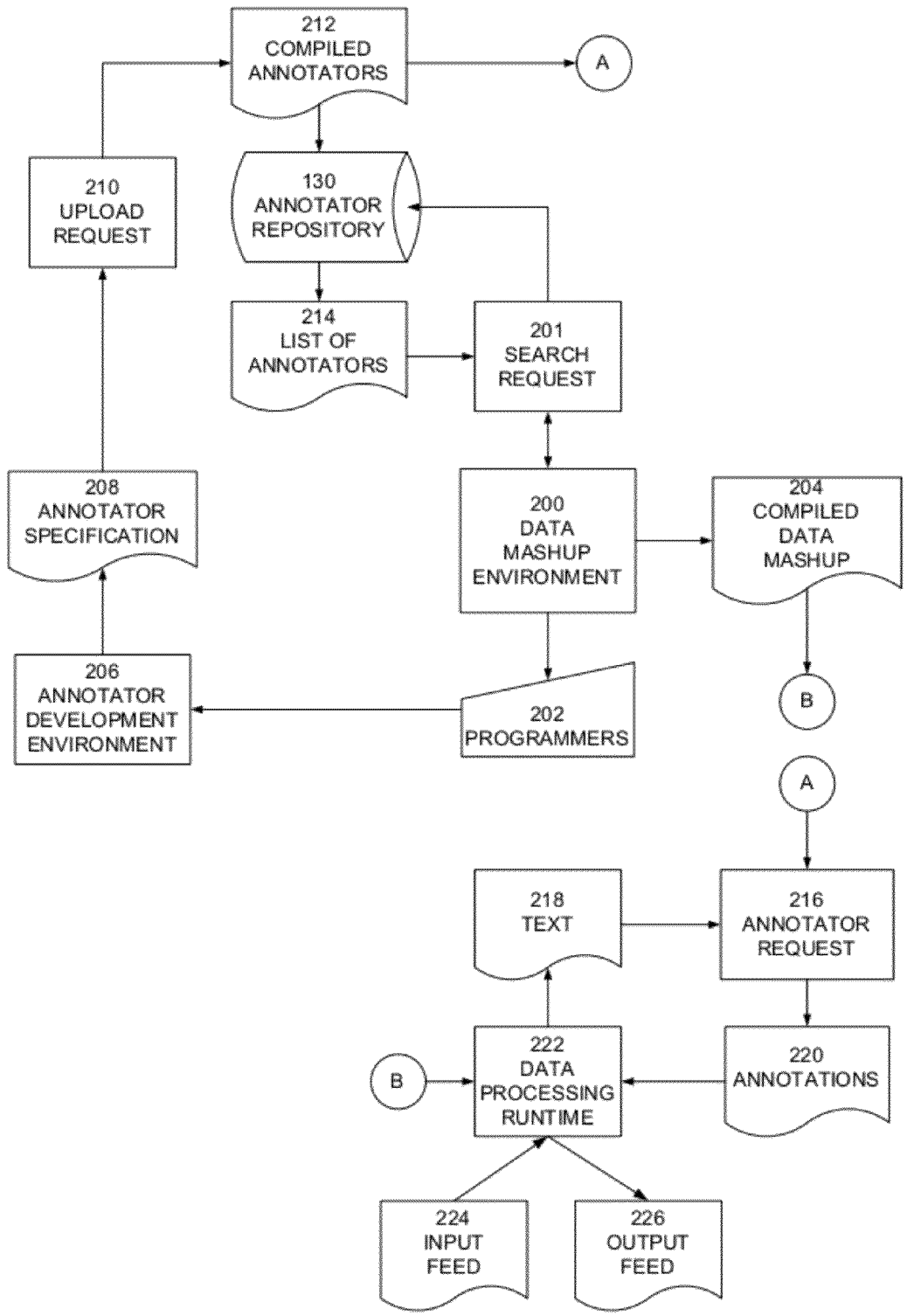
FIG. 2 is a more detailed block diagram of the system of FIG. 1.

FIG. 2 illustrates a more detailed view of the mashup and data extraction system, including a data mashup environment (200) where data mashup programmers (202) can use a GUI to design data mashups. Data mashup environment 200 corresponds to client functions 118, 119 and 121 of FIG. 1. The invention extends the data mashup environment so that users can design data mashups that perform annotate requests. An annotate request is exposed to a data mashup programmer (202) as a built-in annotation function that can be used in the context of a data mashup expression. The data processing runtime (60), corresponding to SystemT 106 in FIG. 1, receives a compiled representation of a data mashup (204) from data mashup environment (200) and executes its sequence of operators. Each operator produces an output feed (226) from one or more input feeds (224). Execution of an operator in the extended data processing runtime might require evaluation of a data mashup expression containing an annotation request (216). Evaluation of this request (216) involves the steps of extracting unstructured text (218) from an input feed (224); retrieving relevant versions of a specified set of compiled annotators (212) from annotator repository (130); applying each of the retrieved compiled annotators (212) to unstructured text (218); and inserting the set of structured annotations (220) obtained from applying each compiled annotator into the output feed (226).

The illustrative embodiment described herein uses an XQuery-based data mashup data processing runtime analogous to an illustrative embodiment described in the U.S. patent application entitled, "INTEGRATING DATA RESOURCES BY GENERIC FEED AUGMENTATION," Ser. No. 12/163,302, filed Jun. 27, 2008. In this illustrative embodiment, a data mashup is represented as a data flow network of operators that interoperate in a demand-driven data flow fashion. Each operator consumes one or more source XML feeds and produces a target XML feed. The invention extends the data processing runtime of the data mashup environment, MashupHub (MH) 102 with the capability to perform annotate requests using an information extraction component based upon IBM's SystemT technology described in "AN ALGEBRAIC APPROACH TO RULE-BASED INFORMATION EXTRACTION". Reiss, F., Raghavan, S., Krishnamurthy, R., Zhu, H., Vaithyanathan, ICDE 2008". Data processing runtime 222 evaluates annotate requests in the context of a data mashup transform operator. A transform operator is responsible for performing a transformation operation wherein an input data feed having one format and structure is transformed to a target data feed having yet another format and structure. The target data feed produced by a transform operator often contains new elements and attributes whose structure and content are derived from expressions involving elements of the input data feed. The definition and workings of a transform operator according to the illustrative embodiment is described in U.S. patent application entitled, "INTEGRATING DATA RESOURCES BY GENERIC FEED AUGMENTATION," Ser. No. 12/163,302, filed Jun. 27, 2008. The present invention extends the set of functions that can be used in transform operator binding expressions with a new annotate function for performing an annotate request (216). The annotate function takes as operands an unstructured text string and the names of a set of annotators to be applied to that text. The function returns a sequence of annotations as output. The unstructured text string operand can be derived from an expression (e.g. a path expression) involving elements and attributes text of the input data feed (224). A set of annotator rule names operand identifies a subset of available annotators that are to be evaluated over the text string input to find corresponding annotations. For example, the specification of annotator rule names might identify a "City" annotator that can be used to find mentions of cities in unstructured text. Each annotation returned by the annotate function invocation is represented by an element node whose sub-elements and attributes represent various properties of an annotation returned by the annotator. For example, the properties of an annotation returned by a City annotator might include a city name (e.g. Mountain View) and optionally the corresponding state (E.g. California) and country (e.g. United States).

Figure 3:
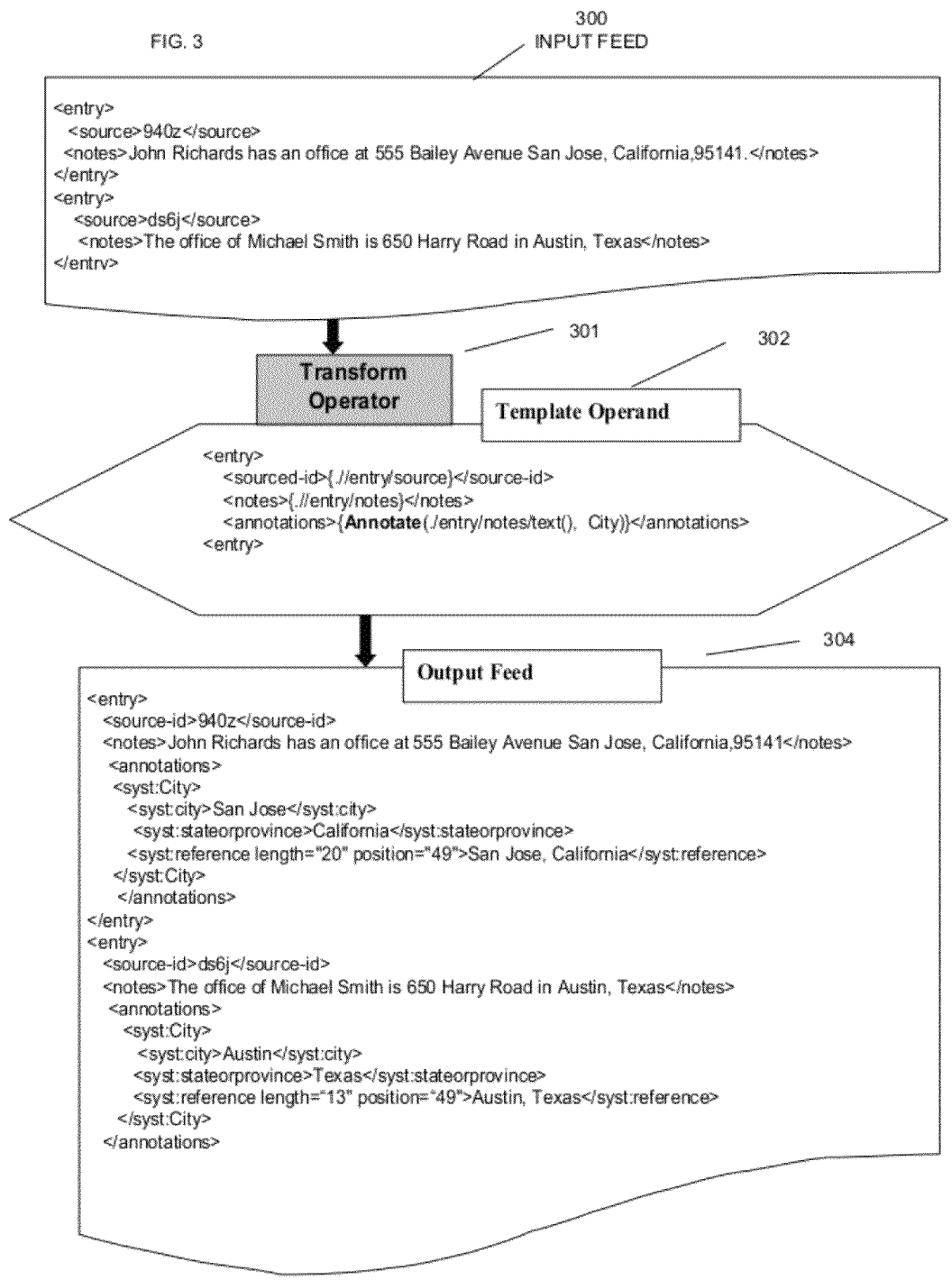
FIG. 3 shows coding details of a transform operator used to extract unstructured data from an input feed and generate a structured output data feed.

FIG. 3 illustrates the input 300 and output 304 of a transform operator 301 that evaluates an annotate request according to the present invention. Specifically, this illustrative transform operator uses the annotate function to apply a "City" annotator to unstructured text of an input feed. FIG. 3 shows an input feed 300 with two entries as delimited by the "entry" tags. Each input feed entry has a "notes" element containing unstructured text. The transform operator 301 extends each input feed entry with a new "annotations" element that contains elements and attributes corresponding to mentions of cities (e.g. San Jose, Austin) found in this unstructured text. Subsequent data mashup operators can now refer to these new structured elements and attributes in their operations. For example, a filter operator could now filter output feed entries that mention San Jose. The transform operator restructures each element of the input feed according to the specified template operand 302. Evaluation of the template 302 is similar to evaluation of an XQuery return clause. The annotate function referenced in the template argument of the transform operator is applied to each input feed entry. The function uses the XPath expression argument /entry/notes/text( ) to extract the unstructured text from the "notes" element of the current input feed entry. It then applies the "City" annotator to the extracted unstructured text and adds the resulting annotations to the template. The result of evaluating the template for the current input feed entry becomes the payload of the output feed. The output feed 304 in FIG. 3 shows the result of applying the City annotator to the input feed. Each of the "syst:City" nodes in the output feed is an annotation representing a single mention of a city in the "notes" element of the input feed. The example shows only a single annotation per input feed entry; however, there could in general be as many annotations in the output feed as there are mentions of cities in the extracted input feed text.

Figure 4:
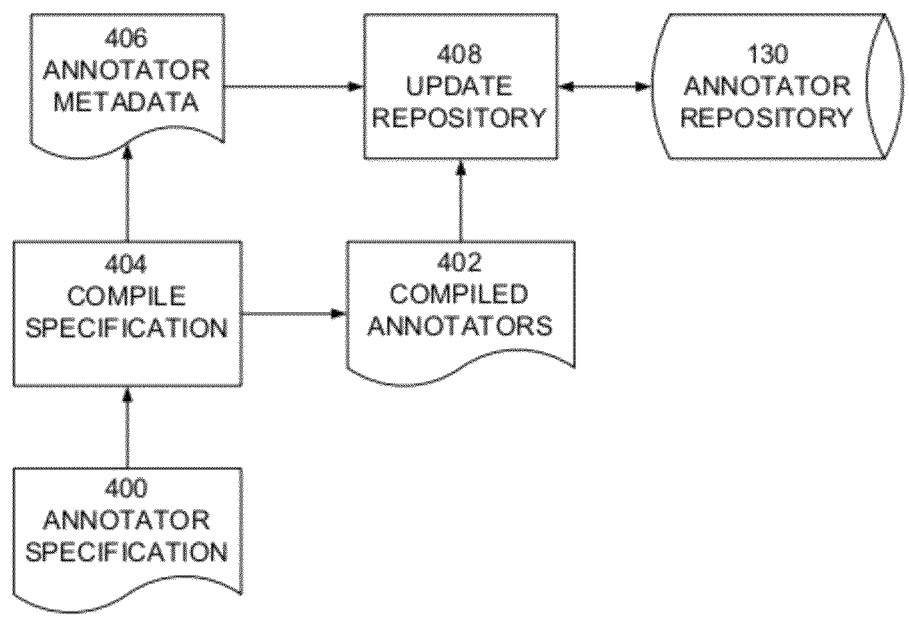
FIG. 4 is a flowchart showing additional illustrative details of box 210 of FIG. 2 used to upload new annotators to an annotator repository.

FIG. 4 expands upon box 210 of FIG. 2 to show the detailed workings of a request to upload a newly designed annotator from the system development environment to the system runtime. Given an annotator specification (400), the specification is first compiled into a set of compiled annotators (402) by a compile specification module (404). At the same time, the annotator metadata in repository 130 is updated (408) with metadata (406) of the new annotator.

The following is a simplified example of a phone number annotator specification (400) written in AQL.

```
create view PhoneNum as
extract
    regex / [0-9] {3} - [0-9] {4}/
    on D.text as number from Document D;
output view PhoneNum;
```

This example annotator named PhoneNum contains instructions to extract phone numbers from a document D that match the regular expression "[0-9] {3}-[0-9] {4}/" as any three digits 0 to 9, followed by a dash followed by any four digits 0 to 9 (ddd-dddd). This annotator is then compiled at 400 into the following execution plan:

```
$PhoneNum =
Project(
    (
        "number" => "number"
    ),
    FastRegEx(/ [0-9] {3} - [0-9] {4}/, (0 => "number"), "DOTALL",
    "D.text,
        Project(
            (
                "text => "D.text"
            )
        $Document
        )
    )
);
```

The execution plan is generated in a language AOG (Annotator Operator Graph), which is a language used by the SystemT information extraction system.

Figure 5:
FIG. 5 shows illustrative data structures of the annotator repository used to store annotator details.
Figure 6:
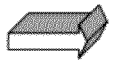
FIG. 6 shows the data structures of FIG. 5 after a new annotator PHONENUM has been uploaded to the annotator repository.

FIG. 5 illustrates some illustrative annotators 500 (PERSON, ORGANIZATION, ACQUISTION) that might be stored in annotator repository 130. In the repository, the metadata of the compiled annotators are stored in an annotators table 502. AQL Data Table 504 is also contained within annotator repository 130 and contains the compiled AOG execution plans. FIG. 6 illustrates how the repository 130 might be updated to add the new annotator PHONENUM to the repository. The AQL data table 504 in the annotator repository (130) is updated with the corresponding compiled AOG plan as well.

Annotators having the same names in the repository are possible in the illustrative system. The system can be configured to either overwrite an existing annotator with a new one, or retain different versions of the annotators of the same names. If the system is configured to retain multiple versions of annotators with the same name, then a search request can be extended with an optional "point in time" parameter. This parameter allows the search request to specify either that the request should retrieve a particular version of the annotator (for cases when the data mashup developer wants the behavior of the mashup not to change over time), or alternatively that the request should retrieve the most recent version of the annotator (for cases when the data mashup developer wants the mashup to use the most up-to-date version of the annotator available)

FIG. 7 expands upon box 216 of FIG. 2 to show the detailed workings of a single invocation of the annotate function to extract data. This process occurs in two phases. During the first phase of execution, the data mashup runtime (707) loads the data mashup specification, either by reading a description stored on the server or through a sequence of user interactions that build the mashup. Inside the metadata of the data mashup is information about the names of annotator output types that the mashup needs to extract from unstructured text at one or more points in the data mashup. The data mashup runtime (707) passes a list of these Type Names (704) to a Fetch Annotators module (703). The Fetch Annotators module (703) generates a Query (702) and sends this Query (702) to the Annotator Repository (130). The Results (705) of the Query contain a list of the annotators that are necessary to produce the specified output types, along with a serialized version of the execution plans for the annotators. The Process Results module (708) reads the query results and compiles the serialized execution plans, producing a set of Compiled Annotators (709), which are sent to the Information Extraction Runtime (710). At this point, the annotators are ready to execute as part of the mashup.

The second phase of execution occurs while executing the data mashup. The data mashup runtime (707) identifies text data that needs to be annotated according to the data mashup specification. The data mashup runtime (707) passes each piece of input text (706) to the Information Extraction Runtime (710). The Information Extraction Runtime (710) then runs the compiled annotators over the text, producing a set of annotations (711). The Information Extraction Runtime (710) passes the annotations (711) back to the data mashup runtime (707), which translates them into the data format used inside the data mashup runtime (707) and sends the resulting data to the next stage of the data mashup.

Referring again to FIG. 2 and box 201, the invention extends the data mashup environment with the capability to execute search requests against the annotator repository (130) to retrieve a list of available annotators (214) that can be referenced in an annotate request. Specifically, the search request provides the names of annotators that can be applied by the Annotate function.

FIG. 8 shows more details of processing a search request (box 201). In the data mashup environment (810) of FIG. 8, a data mashup programmer can generate the names of the annotators of interest (830). Based on such a search request, a construct query module (850) then creates a query (870) to search the annotator repository (130). Once the annotators are identified by the query, the precompiled in-memory execution plans (840) cached in SystemT corresponding to those annotators are found and the corresponding metadata (800) are returned to the data mashup environment (810) by the process results module (820) and presented to the data mashup programmer FIG. 5 illustrates an example of such a process: First, a data mashup programmer specifies three types of annotators of interest (230 and 700), including Person, Organization and Acquisition; next, a query (250-270) is constructed to look up those annotators in the annotator repository (130) and identifies the corresponding rules associated with the annotators; finally, the precompiled in-memory plans (840) corresponding to those rules are identified in the AQL data table.

Referring once again to FIG. 2, the invention further extends the data mashup system with an annotator development environment (206) wherein the set of annotators available to data mashup programmers (202) can be extended via upload requests (210). The annotator development environment (206) allows a data mashup programmer (202) to develop a new annotator by creating an annotator specification (208). An upload request (210) compiles the annotator specification (208) into a compiled annotator (212) and inserts it and associated metadata into annotator repository (130) where it becomes available for subsequent searches (201) and annotate requests (216).

Figure 9:
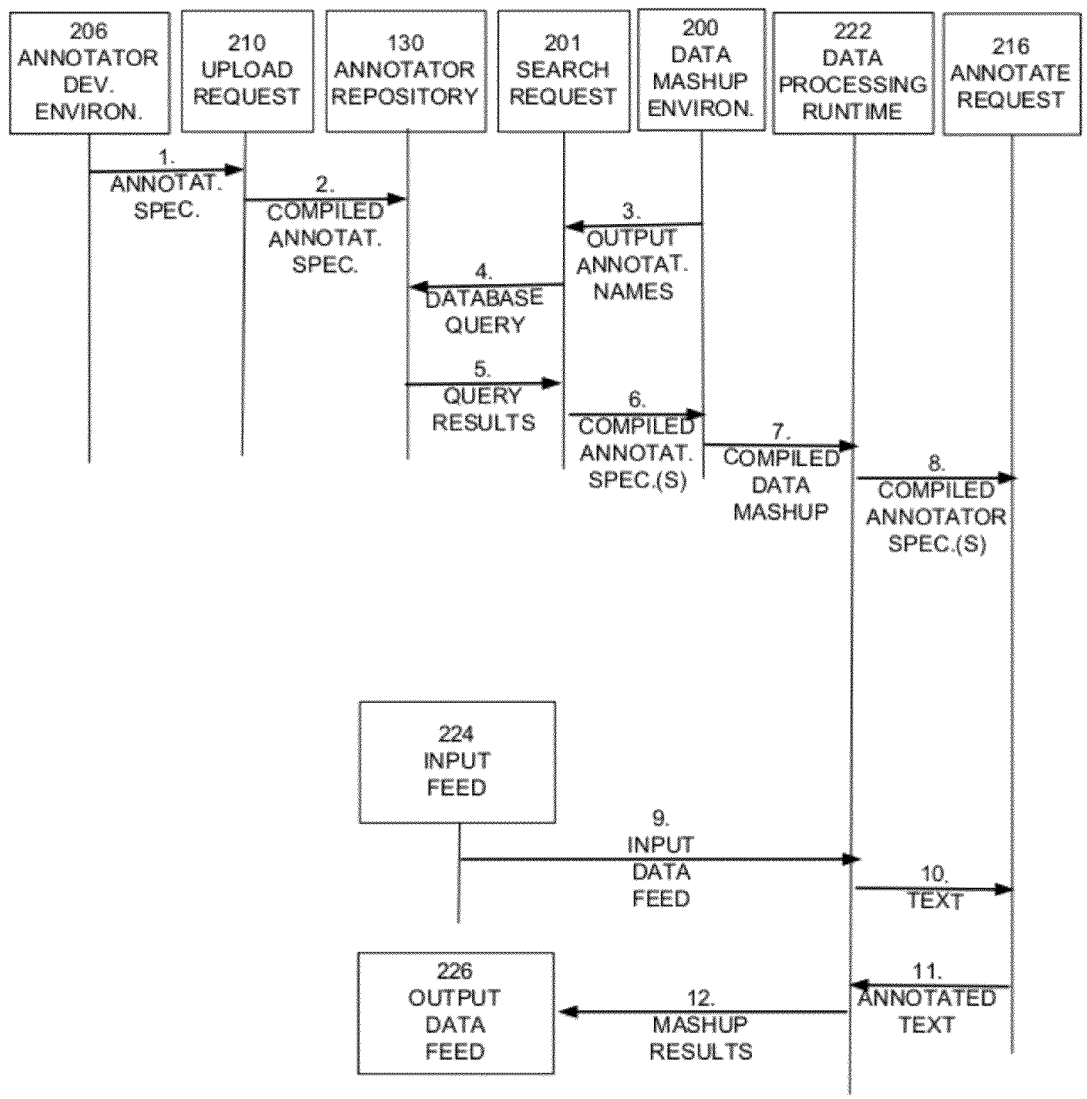
FIG. 9 is a message flow diagram illustrating message communication between the major components of FIG. 2 during both annotator design and runtime mashup data operations using annotators.

FIG. 9 shows how messages flow through the major components and functions shown in FIG. 2. Messages 1 and 2 show an annotator specification being sent to annotator repository 130 after being designed in the annotator development environment 206. Messages 3 and 4 represent the beginning of a search for annotator names stored in annotator repository 130. The names of required annotators are transmitted via a search request 201 and database query to annotator repository 130. The results of the database query are returned at messages 5 and 6 as compiled versions of the requested annotators and delivered to the data mashup environment 200. Data mashup environment 200 generates a compiled mashup specification and delivers the mashup to data processing runtime 222 and annotate request 216. When the mashup begins operation, input data is delivered at 9 to data processing runtime 222. Input text is delivered to annotate request 216 at 10. Annotated text is returned to data processing runtime at 11 and data processing runtime creates the mashup results and generates at 12 the mashup output data stream.

It should also be clear that there are many ways that skilled artisans might use to accomplish the essential steps to produce an overall network solution, other that the specific steps and data structures described herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

We claim:

1. A method of performing data mashup including information extraction capabilities, comprising:
    receiving multiple streams of textual data, wherein at least one stream of textual data contains unstructured textual data;
    storing in a repository annotators describing how to analyze the multiple streams of textual data for unstructured data components that are identified by information contained in the annotators;
    receiving an annotate request to apply a specified set of annotators from the stored annotators to the unstructured textual data;
    applying the specified set of annotators to the unstructured textual data to identify and extract a plurality of unstructured data components according to the specified set of annotators, wherein the plurality of unstructured data components are contained in the unstructured textual data;
    tagging the extracted, unstructured data components to generate tagged, structured data components;
    for each portion of the unstructured textual data corresponding to at least one tagged, structured data component of the generated tagged, structured data components, adding the at least one tagged, structured data component to that portion of the unstructured textual data; and
    combining the multiple streams of textual data, including the at least one stream of textual data having the generated tagged, structured data components, to form a mashup output data stream.

2. The method of claim 1 further comprising an annotator development environment for designing new annotators and for uploading the new annotators to the repository.

3. The method of claim 2 further comprising tightly integrating the annotator development environment and the information extraction capabilities into a client-server system.

4. The method of claim 2 further comprising:
    receiving a search request from a client application against the repository to return a current list of available annotation rules.

5. The method of claim 1 further comprising searching the repository for annotators.

6. The method of claim 1 further comprising:
    storing at least two annotators having identical names and version identifiers in a single active version of the repository; and
    allowing the extraction of unstructured data components to be extracted according to different versions of the at least two annotators.

7. The method of claim 6 wherein the version identifiers comprise timestamps.

8. The method of claim 6 further comprising:
receiving a search request against the repository to return executable annotation rules that were current as of a version timestamp.

9. The method of claim 1 further comprising:
receiving a search request against the repository to return annotation rules that were current at a time a currently executing data stream was created.

* * * * *